UNITED STATES PATENT OFFICE.

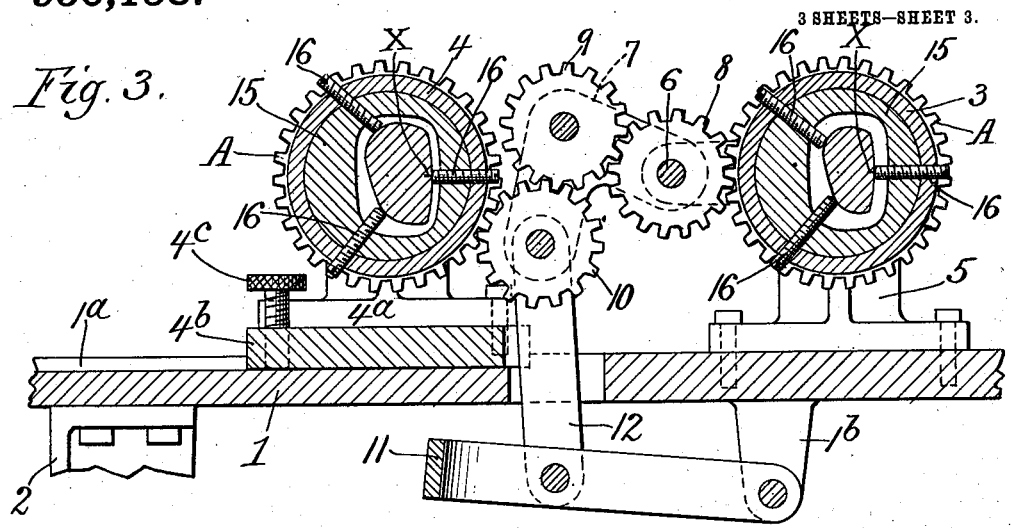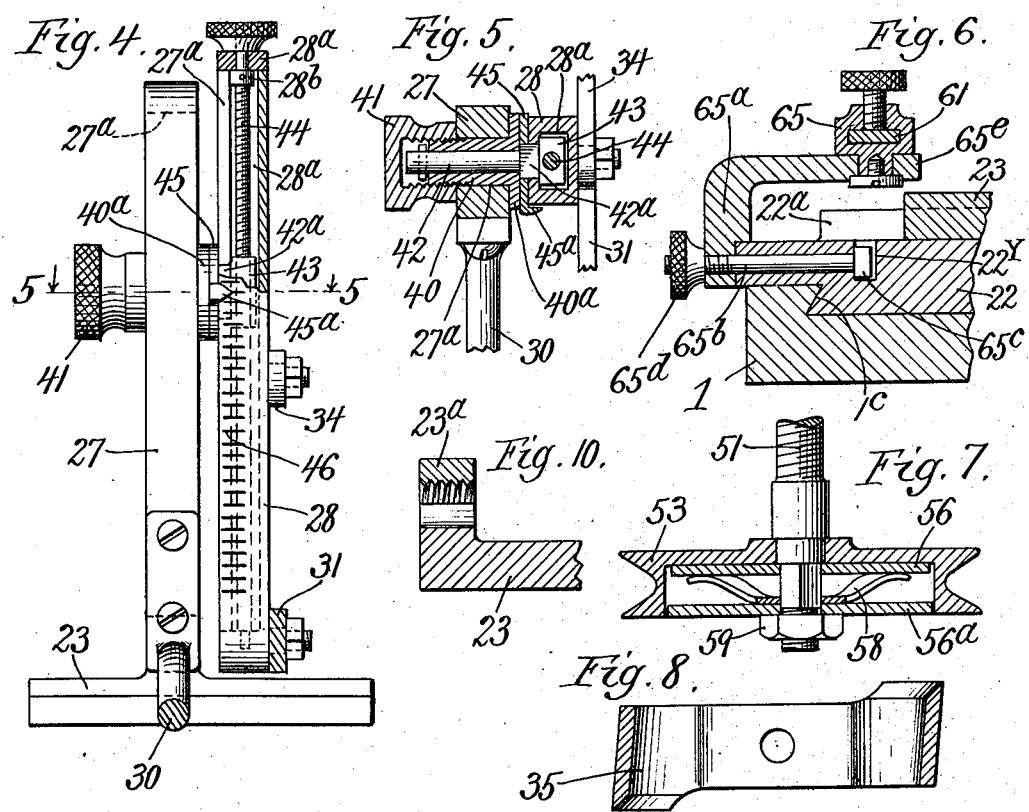

MICHAEL J. O'DONNELL AND FRANK HANSES, OF CHICAGO, ILLINOIS.

MACHINE FOR TURNING IRREGULAR FORMS.

950,158.  Specification of Letters Patent.  Patented Feb. 22, 1910.

Application filed December 16, 1907, Serial No. 406,668. Renewed September 2, 1909. Serial No. 515,910.

*To all whom it may concern:*

Be it known that we, MICHAEL J. O'DONNELL and FRANK HANSES, citizens of the United States, both residing at Chicago, in the county of Cook and State of Illinois, have invented new and useful Improvements in Machines for Turning Irregular Forms, of which the following is a specification, reference being had to the accompanying drawings, forming a part thereof.

The purpose of this invention is to provide an improved mechanism for turning irregular forms and particularly for finishing shoe lasts.

It consists of the elements and features of construction which are shown and described as indicated in the claims.

Figure 1:
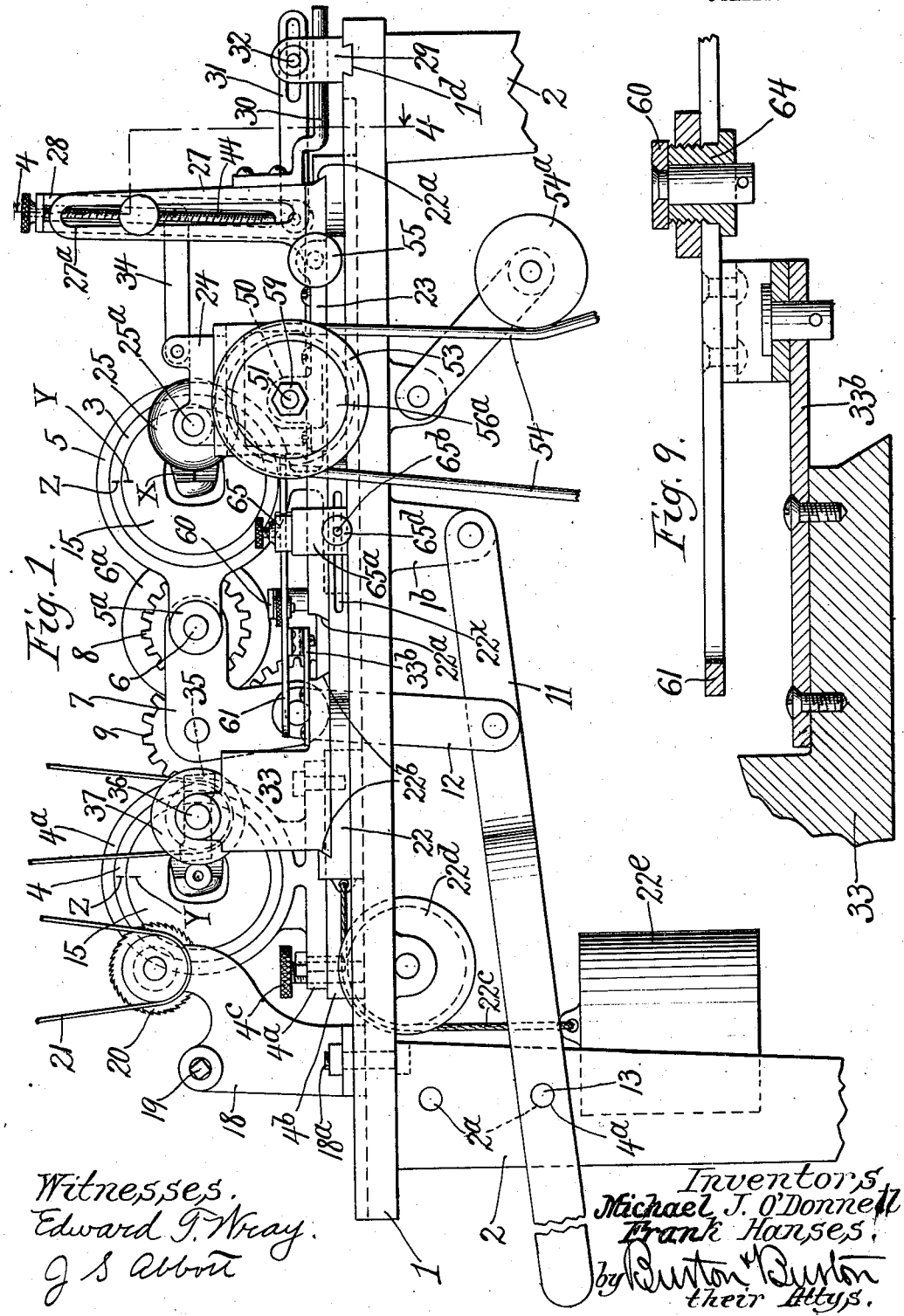
Figure 2:
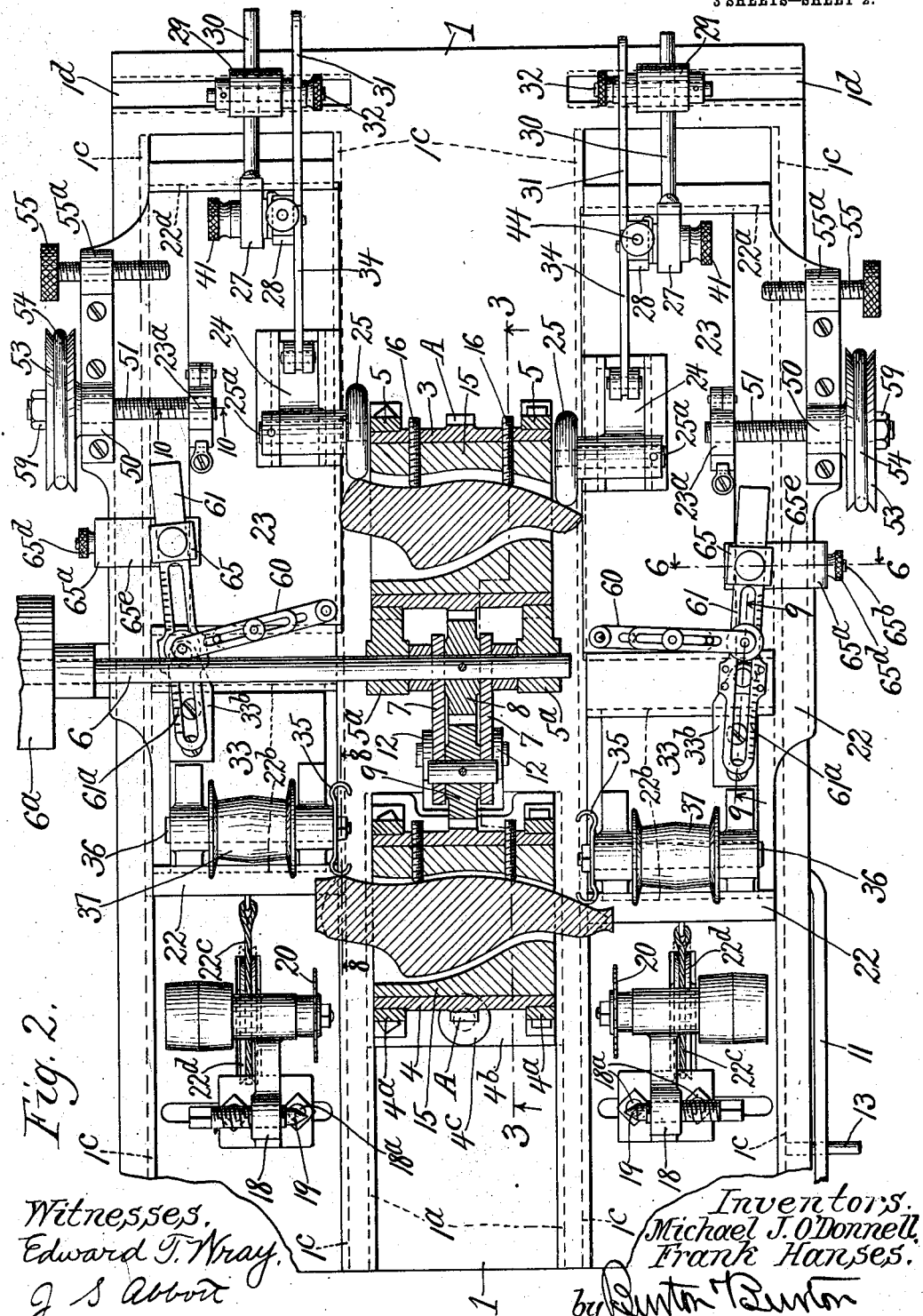

In the drawings:—Figure 1 is a side elevation of a machine embodying this invention. Fig. 2 is a plan view, a portion of the mechanism at one side being omitted. Fig. 3 is a section at the line 3—3 on Fig. 2. Fig. 4 is a detail elevation, partly sectional, of an adjustable connection in the transmission from controller to cutter, section being made at the line 4—4 on Fig. 1. Fig. 5 is a detail section at the line 5—5 on Fig. 4. Fig. 6 is a section at the line 6—6 on Fig. 2 on a larger scale than the latter figure. Fig. 7 is a detail axial section of a friction transmission in the feed connections for one of the movements. Fig. 8 is a section of the cutter at the line 8—8 on Fig. 2. Fig. 9 is a section at the line 9—9 on Fig. 2. Fig. 10 is a section at the line 10—10 on Fig. 2.

The machine shown in the drawings comprises a horizontal bed, 1, mounted on suitable legs or standards, 2. On this bed there are mounted two hollow cylindrical holders, —to wit, a pattern holder, 3, and a work holder, 4, having their axes horizontal and parallel. The pattern holder is housed or journaled at its opposite ends in upright brackets, 5, 5, mounted rigidly on the bed, 1. The work-holder, 4, is similarly housed or journaled in similar upright brackets, 4ª, 4ª, which are mounted upon a slide plate, 7, such slide plate being adjustably mounted on the bed, 1, for sliding longitudinally thereof in a slide-way consisting of the dovetail recess, 1ª, in the top of the bed. The pattern-holder and the work-holder have each an exterior gear rim, A, at about the middle of the length. The brackets, 5, 5, have on the side toward the work holder lugs, 5ª, 5ª, for journal bearings of a driving shaft, 6, mounted therein. On the shaft, 6, between the lugs, 5ª, 5ª, there are pivoted the two similar members, 7, 7, of a triangular gearing frame in which are mounted gears, 8, 9 and 10, meshing consecutively with each other, the gear, 8, being meshed with the gear rim, A, of the pattern holder, and the frame being adapted to swing about its pivotal support on the shaft, 6, so as to bring either of the gears, 9 and 10, into mesh with the gear rim, A, of the work-holder. The means for shifting the adjustment for one connection or the other and for holding the frame in position for proper meshing of one gear or the other, comprises a lever arm, 11, fulcrumed on a downwardly projecting lug, 1ᵇ, of the bed and connected by a yoke or fork link, 12, with the triangular gearing frame, 7, 7, such connection being most conveniently made at the shaft of the gear, 10, which protrudes from its bearings sufficiently for that purpose, as seen in Fig. 2. The lever arm, 11, extends out past the standards, 2, at one end of the bed, and provision is made for securing it in either of the two positions to which it is moved for bringing one or the other of the gears, 9 or 10, into mesh, as stated, the provision shown being a pin, 13, inserted through a hole, 11ª, in the lever and taking into one or the other of two holes, 2ª, 2ª, in the standard. It will be understood that when the gear, 9, is meshed with the gear arm, A, of the work-holder, the two holders revolve in opposite directions, and when the gear, 10, is so meshed, they revolve in the same direction.

This machine is shown especially adapted to finishing shoe lasts which have been first roughed out in any suitable lathe for turning irregular forms in which the work is carried by the ends upon centers and in which the end portions are therefore unfinished, and the machine is shown in the process of finishing such lasts at the ends, but it will be understood that it is designed equally for turning irregular forms for any purpose which require to be finished at the ends and therefore cannot be held at the ends, but must have them exposed to the finishing devices. The pattern and work holders, 3 and 4, are designed, therefore, for holding the pattern and work by grasping it intermediate the ends. For this purpose, a lining, 15, may be provided in each of the hollow cylindrical holders, 3 and 4, having itself a cavity suitably approximating that of the last or other article to be held and finished, so as to diminish the amount of adjustment of the holding devices, which obviously would hold a device of any form which could be inserted within the cylinder at any position within it without regard to such lining. The holding devices may be set screws, 16, 16, set in through the shell of the cylindrical holders, preferably at three points in the circumference at each of two transverse planes in the length of the holders, as may be understood clearly from comparison of Figs. 2 and 3, such set screws impinging upon the object to be held, whether pattern or work, so as to fix it positively and definitely in position within the holder. It will be understood that the axes of the pattern and work respectively must be similarly situated in their respective holders in order to cause the form of the pattern to be reproduced on the work, and preferably,—as indeed the only practical means of mounting the two similarly,—each should be mounted with the axis about which it was rotated in roughing out coincident with the axis of the holder. This is accomplished in respect to the pattern-last, by any of the means by which an object may be centered in a rotating holder, the poles of the axis being customarily pencil-marked on the pattern or evident from the remnant of the center pin mark left in the original cutting of the pattern. For the purpose of centering the work in the work-holder, there are provided, mounted on the bed, one at each side, a bracket, 18, carrying a center point, 19, the axis of the two center points being at the level of the axis of the cylindrical holders, 3 and 4. The slide plate, 4$^b$, which is secured in position on the bed by a set screw, 4$^c$, is moved in its slide-ways,—the set screw being relaxed,—out toward the end of the bed to a stop—located on the bed for stopping the slide plate at the position at which the axis of the cylindrical holder is coincident with the axis of the center points, and the work being then engaged by the center points as it was originally engaged by like center points in the process of roughing out. The set screws, 16, are adjusted up to grasp it in that position, and so secure it properly co-axial with the holder. Preferably, the excess of material at the ends of the work beyond the outline to which it is to be reduced in the finishing process may be sawed off before the finishing process is commenced, thereby reducing the amount of material to be cut away in finishing, and for that purpose there is mounted in the bracket, 18, which carries the center point, a saw, 20, driven by a belt, 21, from an overhead pulley, not shown, the bracket, 18, being adjustable on the bed,—the securing bolts, 18$^a$, having the necessary range of movement in the slots of the bed,—to locate the saw in position to cut off the excess material at the ends of the work while the work-holder is being moved back into position for meshing its gear rim with the gear train for rotating it.

At each side of the bed,—that is, occupying space at opposite ends of the pattern and work holders,—there are mounted on the bed the pattern-following and work-dressing devices for dressing the two ends of the work mounted in the work holder.

In a dove-tail slide-way, 1$^c$, formed in the top of the bed, extending longitudinally thereof, there is mounted for sliding a base carriage, 22, for carrying the pattern follower and work cutter respectively past the ends of the pattern and work. This carriage, 22, has connected to it a cable, 22$^c$, which runs thence over a pulley, 22$^d$, mounted on the bed, and carries at the end a weight, 22$^e$, suspended below the pulley, and thereby adapted to propel the carriage, 22, along the slide-way toward the left-hand end of the bed. The carriage, 22, carries the devices for dressing the work, more particularly hereinafter described, and the weight, 22$^e$, affords the pressure for holding and advancing the dressing devices against the work transversely to the axis of the latter. On the carriage, 22, there are mounted in slide-ways, 22$^a$ and 22$^b$, respectively, extending transversely of the bed,—that is, parallel to the axis of the holder,—secondary carriages, 23 and 33, for carrying respectively the pattern follower and the work cutter. The cutter head, 35, for dressing the work, is mounted on the end of the shaft, 36, journaled in the carriage, 33, and driven by a belted pulley, 37, thereon from a source of power not shown. On the carriage, 23, there is mounted a third or final carriage, 24, in which there is journaled a pattern follower, 25, which is a smooth disk with a rounded edge fast on the end of the spindle, 25$^a$, journaled in said carriage, 24. This pattern follower projects into a path in which the end of the pattern and the corresponding end of the work also project, so that the longitudinal movement of the base carriage, 22, carries the pattern follower against the projecting end of the pattern. The means connecting the two carriages, 22 and 24, are calculated to relate the longitudinal movements of the two carriages to each other in proportions determined by the adjustment of the connections so that the work may be cut by the dressing devices in the form of the pattern, but larger or smaller according to such adjustments. These connections will now be described.

A post, 27, projects up rigidly from the base of the carriage, 23, immediately adjacent to its engagement with the slide-way, 27$^a$. A link or lever, 28, is pivoted to the post and extends in general vertically there-along, having a range of oscillation back and forth past the vertical position in the operation of the mechanism, as hereinafter indicated. In a transverse slide-way, 1$^d$, a short post, 29, is mounted on the bed, 1, near the end beyond the range of travel of the carriage, 22, such post, 29, being connected with the post, 27, so as to be carried transversely of the bed with the carriage, 23, a rigid bracket arm, 30, bolted to the post, 27, and extending through the post, 29, effecting this connection, which causes the two posts to be rigid as to transverse movement while permitting the post, 27, to move longitudinally with the carriage, 23, toward and from the post, 29. A link, 31, pivotally connected to the lower end of the link, 28, is pivoted also at 32 to the post, 29. This affords a pivot point for the lower end of the link, 28, which is fixed as to longitudinal movement, but has possibility of up-and-down movement about the pivot, 32. Intermediate its ends the link, 28, is connected by the link, 34, to the final carriage, 24. The pivot which connects the link, 28, to the post, 27, is made adjustable longitudinally of both the connected elements for carrying it one side or the other of the pivotal connection of the link, 28, by means of the link, 34, to the carriage, 24. It will be obvious that when these two pivots coincide, the carriage, 24, will have no movement on the carriage, 23, and the work cutter mounted on the carriage, 33, will have the same travel longitudinally of the bed as the pattern follower, 25, on the carriage, 24; but the pivot of the link, 28, to the post, 27, being shifted upwardly past the pivot of the link, 28, to the link, 34, will cause the carriage, 24, to be retracted relatively to the carriage, 23, in the movement of the base carriage, 22, to the left so that the pattern follower will have less movement than the cutter, or rather,—since the movement of the pattern follower is positively controlled by the pattern which stands in its path and prevents any movement except in conformity with its outlines,—the cutter will have greater movement than the follower; but if the pivot of the link on the post is shifted downward past the pivot of the links, 28 and 34, the movement of the pattern follower will be greater than the movement of the cutter, and the cutter will therefore dress the work in conformity to the pattern, but on a reduced scale.

In order to provide for shifting the pivot of the lever, 28, to the post, 27, as indicated,—that is to say, longitudinally with respect to both the parts which are thus pivoted together,—the construction is that shown in Figs. 4 and 5. A square sleeve, 40, having a flange, 40$^a$, at one end, extends through the longitudinal slot, 27$^a$, of the post, being stopped by its flange at one side and provided with a cap nut, 41, screwed on to the end protruding at the opposite side. A pivot bolt, 42, having an enlarged shoulder portion, 42$^a$, and an elongated head, 43, longitudinally pierced and threaded, is inserted through the slot, 28$^a$, of the lever, 28, the said enlarged shoulder occupying the slot and the pintle extending through the sleeve, 40, for rotation therein. A threaded shaft, 44, is mounted in the offset ends, 28$^a$, of the link and longitudinally stopped by a collar, 28$^b$, inside of one end, said screw shaft taking through the longitudinally pierced and threaded head, 43, of the pivot bolt, 42. A washer, 45, is interposed between the link, 28, and the flanged head of the sleeve, 40, and is provided with an index finger, 45$^a$, offset to project alongside the edge of the link which is graduated, as seen at 46 in Fig. 4. The cap nut, 41, being tightened on the sleeve, 40, clamps the latter to the post, leaving the pivot bolt, 42, free to turn in the sleeve. For adjusting the pivot up and down in the slots of the post and link, the nut, 41, being slacked, the screw shaft, 45, is rotated, feeding the pivot bolt either way to the desired point, as indicated by the index finger on the graduated scale, 46, provided on the edge of the link. During such adjustment, the link may be prevented from descending by clamping the link, 31, to the short post, 29, at its pivot thereto, the pivot bolt being suitably constructed for such clamping, or the link may be merely held in the position by being blocked up while the adjustment is being made.

The follower and cutter-head are adapted to follow the pattern longitudinally by the provision of the carriages, 23 and 33, mounted for sliding transversely on the bed, and their connections, as hereinafter described, for relating their movements to each other as the pattern is proportioned to the work. The transverse movement originates with the carriage, 23, and is transmitted with regulated modifications to the carriage, 33. For moving the carriage, 23, transversely on the base carriage, 22, there is journaled in a lug, 50, projecting up from the base carriage, 22, a threaded shaft, 51, which takes into a lug, 23$^a$, upstanding from the base of the carriage, 23, so that the rotation of the shaft, 51, in one direction retracts the carriage from the pattern holder, and in the opposite direction advances it toward said holder. On the shaft, 51, is a pulley, 53, driven frictionally by a belt, 54, provided with a take-up pulley, 54$^a$, and having sufficient slack to be taken up by the pulley to accommodate the movement of the pulley, 53, with the base carriage, 22. Rotary movement is communicated frictionally from the pulley, 53, to its shaft, 51, said pulley, 53, being loose on the shaft and being in the form of a flanged disk within whose flange there is lodged against the face of the disk and engaged with a squared shoulder on the shaft a friction plate, 56, whose frictional pressure for communicating the motion of the pulley to the shaft is produced by a spider-spring, 58, on the shaft, whose tension is regulated by means of a nut, 59, screwed on to the shaft, a plate, 56$^a$, being preferably interposed to close the pulley at the outer side and inclose the spring therein. It is necessary to insure that the cutter shall halt in its travel long enough for the work to make a complete revolution after the cutter reaches the position corresponding to the end of the pattern, and for this purpose the retracting movement of the carriage, 23, is necessarily limited at corresponding position. To so limit said movement of the carriage we provide an adjustable stop screw, 55, which is set through a lug, 55$^a$, in the bracket in which the bearing of the shaft, 50, is provided, which may be screwed back and forth through said lug to limit the rotation of the carriage, 23, whose edge will stop against the end of the screw, the pulley, 53, slipping at its frictional connection with the shaft, when such stoppage occurs. When the resistance of the work to the cutter is such as to require slower advance of the cutter along the work in order to complete the cutting necessary to make the work conform to the shape of the pattern and avoid crowding the pattern follower back from the pattern, as might happen under some circumstances, the rate of feed for advancing the pattern follower carriage by means of the screw, 51, can be reduced by the operator by slacking the pressure of the slack take-up pulley, 54$^a$, on the driving belt, 54, which may be done by merely lifting the swinging frame, 53, of the slack take-up pulley by hand, said frame being in position to be easily reached for that purpose without special provision.

For transmitting the transverse movement of the carriage, 23, to the carriage, 33, with such modification as may be necessary to cause the tool to operate upon the work, whether larger or smaller than the pattern, or to transmit such motion equally when the work is the same size as the pattern, there is provided on the carriage, 23, and adapted to be rigid therewith, an extensible bar, 60, connected at one end to a link, 61, said link being pivotally connected to a pivotal device, 65, mounted on the base carriage, 22, and being also connected at a point intermediate its ends with a bracket arm, 33$^b$, rigid with the carriage, 33. The link is slotted for receiving a pivot, 64, by which it is connected with the extensible bar, 60. When the pivotal connection of the link with said bar is coincident with its pivotal connection with the carriage, 33, it will be seen that the transverse movement of the carriage, 23, is communicated unchanged in amount to the carriage, 33. When said pivotal connection is shifted away from the pivot of the link to the carriage, 33, toward the pivot of the link on the pivotal device, 65, which is mounted on the base carriage, 22, as stated, the carriage, 23, is caused to transmit increased movement to the carriage, 33. When shifted in the other direction from the pivot of the link to the carriage, 33, the transmitted movement is decreased. The link has a graduated scale, 61$^a$, for the purpose of adjusting the connection so as to cause any desired amount of increase or decrease of the transmitted movement, for causing the cutter controlled by the pattern to reproduce the form thereof on the work, either enlarged or diminished, according to the size of the roughed-out last which is being finished. The bar, 60, is desirably made extensible, as above stated and as shown, in order that the carriage, 33, may be adjusted to an initial position for starting on the work corresponding to the relative protrusion from their respective holders of the work piece and the pattern which will correspond to their respective sizes; and in effecting this adjustment, where the pattern is very greatly different in size from the work, it will be found desirable in some cases to adjust the pivot device, 65, along the base carriage, 22, and it is for this reason shown adjustably mounted on said base carriage. This pivotal device, 65, is mounted in a bracket post, 65$^a$, rabbeted to engage the corner of the base carriage, and secured thereto by a bolt, 65$^b$, which extends through a horizontal slot, 22$^x$, which extends longitudinally of the base carriage, 22, connecting with a vertical longitudinal slot, 22$^y$, in which the head, 65$^c$, of the bolt, 65$^b$, is accommodated, a nut, 65$^d$, on the outer threaded end of the bolt serving to bind the bracket post to the rear end of the base carriage, 22, at any position to which it may be adjusted along the length of the slot. The pivotal device, 65, is pivotally seated in the overhanging arm, 65$^e$, of the bracket post and has a slide-way through its head for the link, 61, which requires accommodation for the sliding longitudinal movement resulting from the fact that its point of pivoting to the carriage, 33, must travel in a direct line while the link swings about its pivotal connection to the pivot device, 65.

By means of the expedient of reversing the direction of rotation of the work-holder with respect to the pattern-holder, consisting in the oscillating gear-train comprising the gears, 8, 9 and 10, shifted so that either the second or the third of the train alternatively may become the immediate driving gear for the work-holder, any pattern may be used to control the finishing of either a similar or a reciprocal form,—that is to say, either a right or left last,—no other change being necessary except the shifting of the gear train as indicated.

It will be understood that the holders for the pattern and work are to be rotated slowly in comparison with the cutter-head, and any suitable means for communicating such relatively slow movement may be employed, and it is not necessary that such movement shall be accurately timed with respect to that of the cutter; hence the belted pulley, 6ª, on the shaft, 6, deriving power from any convenient source, constitutes a suitable means for the purpose. It will be understood, also, that when the work-piece is substantially formed as to shape throughout a portion of its length, as in the case of the particular work shown,— namely, shoe lasts which are to be finished at the ends only with this machine,—the pattern and work-piece must be mounted in their respective holders in perfectly similar position; that is, so that the pattern follower and the cutter bear against the pattern and the work piece respectively at corresponding points in the outline; and to insure such relation, it is necessary in moving the slide-plate, 7, back to position for meshing the work-holder with the driving train after having withdrawn it for centering the work-piece and sawing off the stub, care should be taken to bring the elements into mesh at the right point, and for that purpose the pattern and work-piece are marked at any corresponding selected points and mounted in their respective holders with their marks coinciding with index marks correspondingly situated on the two holders; and the pattern holder being rotated to position at such index mark registers with an index mark on its housing bracket, 5. The work-holder is rotated to similar position and held at that position while being brought into mesh with the driving train. In the case of a shoe last, the convenient registering mark consists of a line, X—X, extending on the sole from heel to toe.

Y represents the index mark on the end of the holder which is brought to registration with the line, Z, on the housing bracket, 6, for the purpose described.

We claim:—

1. In a machine for turning irregular forms, holders for the work and pattern respectively from which both ends of such work and pattern protrude; means for similarly positioning the work and pattern in their respective holders; means for securing them for rotation with the holders, in combination with a bed upon which said holders are mounted with their axes parallel; base carriages mounted for travel on said bed transversely to the axes of the holders at opposite ends thereof; two secondary carriages on each base carriage, one for a pattern follower and one for a cutter, such carriages being mounted for movement on the base carriages transversely of the movement of the latter, and means for giving to said carriages their respective movements, said means for the carriages at one side being independent of the like means for the carriages at the opposite side.

2. In a machine for turning irregular forms, in combination with a bed, holders mounted on the bed for work and pattern respectively adapted to hold such work and pattern with the ends of the latter protruding; means for similarly positioning the work and pattern in their respective holders; means for securing them for rotation with the holders, and means for rotating the holders synchronously; base carriages mounted on the bed for travel longitudinally thereof past the opposite ends of the work-holder and pattern-holder; two secondary carriages on each of said base carriages mounted thereon for movement parallel with the axes of the pattern and work holder; means for moving the base carriages independently of each other, and means for moving the secondary carriages on each base carriage independently of those on the other base carriage.

3. In a machine for the purpose indicated, a main support or bed; holders for pattern and work from which respectively the ends of the pattern and work protrude mounted on such bed; means for similarly positioning pattern and work in such holders, and means for synchronously rotating the two holders, in combination with a base carriage mounted on the bed for sliding in direction transverse to the axes of the holders; secondary carriages mounted on the base carriage for sliding transversely to the sliding movement of said base carriage, lever connections between the two secondary carriages and a fulcrum for such lever connections fixed on the base carriage, one of the pivots of said connections being movable with respect to the connected parts to vary the relative transverse movement of said secondary carriages.

4. In a machine for the purpose indicated, in combination with holders for pattern and work from which they respectively protrude, means for rotating them synchronously; a bed on which they are mounted; a base carriage mounted on such bed for movement transverse to the axes of the holders; secondary carriages mounted on the base carriage for sliding transversely to the movement of the base carriage; a cutter head mounted on one of said secondary carriages; a pattern follower cariage mounted on the other of said secondary carriages for movement thereon transversely to the sliding movement of said secondary carriage on the base carriage;

means for yieldingly propelling the base carriage longitudinally; means for actuating the pattern-follower-supporting secondary carriage; lever connections between the two secondary carriages; a fulcrum for such lever connections on the base carriage; lever connections between the pattern follower carriage and the cutter-carrying secondary carriage; a fulcrum for such lever connections fixed against longitudinal movement on the supporting bed, and means by which the pattern-follower-supporting secondary carriage actuates said fulcrum in its movement transversely of said base carriage.

5. In a machine for the purpose indicated, in combination with holders for the pattern and work, a bed upon which they are mounted; means for rotating them synchronously; a base carriage mounted for movement on the bed transversely of the axes of the holders; a cutter and a pattern follower carried by such base carriage; a final carriage for one of said elements movable on the base carriage in the same direction as the base carriage is movable on the bed; a lever pivotally mounted on the base carriage; pivotal connection from said lever to said final carriage, and a second pivotal connection from said lever to the bed, the pivot of the lever to the base carriage being movable to vary the relation of its distances from its other two pivotal connections respectively.

6. In a machine for the purpose indicated, in combination with holders for the pattern and work, a bed upon which they are mounted; a base carriage mounted for movement on the bed transversely of the holders; a cutter head and a pattern follower carried by the base carriage; a final carriage upon which one of said elements is mounted for movement along the base carriage in the same direction in which said base carriage is movable on the bed; a slotted post on the base carriage; a slotted lever mounted alongside the post; a link from the lever to said final carriage; a check connected with the bed engaging the lever for preventing its movement longitudinally of the bed; a pivot connecting the slotted lever to the slotted post and adjustable in the slots of said two parts for varying the distances of such pivot from the two other connections of the lever.

7. In a machine for the purpose indicated, in combination with the pattern holder and the work holder, a bed upon which they are mounted; a base carriage mounted for movement on the bed transversely of the holders; a weight and connection therefrom to the base carriage for moving the latter yieldingly in one direction; a cutter head and a pattern follower carried by the base carriage; means for rotating the pattern holder and the work holder; means for actuating the rotating cutter head; secondary carriages mounted on the base carriage for movement transversely thereof; means for so moving the pattern follower carriage, and connections from said secondary carriage to the other secondary carriage for moving the latter.

8. In a machine for the purpose indicated, in combination with the pattern holder and the work holder, a bed upon which they are mounted; a base carriage mounted for movement on the bed transversely of the holders; a weight and connection therefrom to the bed for moving it yieldingly in one direction; a cutter head and a pattern follower carried by the base carriage; means for rotating the pattern holder and the work holder; means for actuating the rotating cutter head; secondary carriages mounted on the base carriage for movement transversely thereof; driving means for so moving the pattern follower carriage comprising a slipping frictional connection and means for modifying the pressure at such connection and positively affording connection from the pattern follower carriage to the cutter carriage.

9. In a machine for the purpose indicated, in combination with holders for the work and pattern respectively, from the ends of which the work and pattern protrude; means for similarly positioning the work and pattern in their respective holders and means for securing them for rotation with the holders; a pattern follower and a cutter and carriages in which they are respectively mounted; a base carriage on which such holder and cutter carriages are both carried, the base carriage being mounted for movement in one direction on the bed, and the holder and cutter carriages being mounted for movement in transverse direction on the base carriage; operating means for moving the base carriage; driving means for moving the follower carriage on the base carriage and connections from the follower carriage to the cutter carriage for controlling the movement of the latter by the former, the driving means for so moving the pattern follower carriage comprising a slipping frictional connection and means for modifying the same, and positively operating connections from the pattern follower carriage to the cutter carriage.

10. In a machine for the purpose indicated, in combination with holders for the work and pattern respectively, from the ends of which the work and pattern protrude, means for similarly positioning the work and pattern in their respective holders and means for securing them for rotation with the holders; a pattern follower and a cutter and carriages in which they are respectively mounted; a base carriage on which such holder and cutter carriages are both carried, the base carriage being mounted for movement in one direction on the bed and the holder and cutter carriages being mounted for movement in transverse direction on the base carriage; operating means for moving the base carriage; driving means for moving the follower carriage on the base carriage and connections from the follower carriage to the cutter carriage for controlling the movement of the latter by the former, the driving means for moving the pattern follower carriage comprising a frictional connection at which slipping can occur and means for varying at will the friction at such connection, said varying means being adapted to be operated while said driving means is operating.

11. In a machine for the purpose indicated, in combination with a bed and the pattern holder and work holder mounted thereon, means for rotating said holders; a pattern follower and a cutter head and carriages on which they are mounted for movement both parallel to and transversely of the axes of the holders; yielding means for moving them transversely; frictionally driven means for moving them parallel with said axes, said last mentioned means comprising a screw shaft and a threaded bearing for the same, said bearing being in two parts and adapted to be opened to permit the screw shaft to slide therethrough for moving the carriages in the direction of the axes of the holders.

12. In a machine for the purpose indicated, hollow open-end work holders for pattern and work respectively, each mounted for rotation about a longitudinal axis extending through its cavity and each having an exterior gear rim, in combination with a train of gears connecting said gear rims of the two holders; a gear frame in which such train is mounted pivoted for rocking about the axis of the extreme gear of the train which meshes with one of the gear rims, and having a range of movement about said axis suitable for bringing either the other extreme gear or the next preceding gear thereto alternately into mesh with the other holder gear rim, and means for so adjusting and securing the gear frame.

13. In a machine for the purpose indicated, hollow open-end holders for pattern and work respectively, each mounted for rotation about a longitudinal axis extending through its cavity, and each having an exterior gear rim; a gear train which connects said gear rims; a bed upon which both the holders are mounted; an intermediate slide plate on the bed for carrying the work holder with range of movement toward and from the pattern holder; center points mounted on the bed at the level of the axis of the work holder at a greater distance from the pattern holder than the position of the work holder when its gear rim is meshed with the train, the plate being adapted to slide to carry the work holder from position of alinement of its axis with said center points to position for meshing with the train.

14. In a machine for the purpose indicated, in combination with the open-end holders for pattern and work respectively, open bearings in which their ends are housed or mounted for rotation; a bed which supports said bearings; a slide plate interposed between the bed and said bearings of the work holder mounted for sliding toward and from the pattern holder; a saw mounted for rotation transverse to the axis of the work holder at a distance therefrom, the plate being movable to carry said work holder past the saw.

15. In a machine for the purpose indicated, in combination with holders for the work and pattern respectively, from the ends of which the work and pattern protrude, means for similarly positioning the work and pattern in their respective holders, and means for securing them for rotation with the holders; a pattern follower and a cutter and carriages in which they are respectively mounted; a base carriage on which such holder and cutter carriages are both carried, the base carriage being mounted for movement in one direction on the bed and the holder and cutter carriages being mounted for movement in transverse direction on the base carriage; operating means for moving the base carriage; driving means for moving the follower carriage on the base carriage, and connections from the follower carriage to the cutter carriage for controlling the movement of the latter by the former, the driving means for so moving the pattern follower carriage comprising a slipping frictional connection and means for modifying the same; positively operating connections from the pattern follower carriage to the cutter carriage, and an adjustable stop for limiting the travel of the pattern follower carriage transversely of the base carriage.

In testimony whereof, we have hereunto set our hands, in the presence of two witnesses, at Chicago, Illinois, this 13th day of December, 1907.

MICHAEL J. O'DONNELL.
FRANK HANSES.

In the presence of—
CHAS. S. BURTON,
J. S. ABBOTT.